United States Patent [19]

Degrand

[11] Patent Number: 5,661,201

[45] Date of Patent: Aug. 26, 1997

[54] THERMOPLASTIC FILM CAPABLE OF BEING SEALED BY HIGH FREQUENCY CURRENT

[75] Inventor: Michel Degrand, Les bruyéres du Bois Taillefer, France

[73] Assignee: Elf Atochem S.A., France

[21] Appl. No.: 422,396

[22] Filed: Apr. 14, 1995

[30] Foreign Application Priority Data

Apr. 20, 1994 [FR] France ................... 94 04724

[51] Int. Cl.$^6$ ............... C08K 5/20; C08K 3/34; B32B 7/12; B65D 65/00
[52] U.S. Cl. ............ 524/233; 524/451; 524/492; 428/345; 428/347; 428/521; 156/274.4; 229/87.01
[58] Field of Search ................. 524/233, 492, 524/451; 428/345, 347, 521; 156/274.04; 229/87.01

[56] References Cited

U.S. PATENT DOCUMENTS

| | | | |
|---|---|---|---|
| Re. 32,325 | 1/1987 | Smith | 524/229 |
| 4,183,882 | 1/1980 | Weinberg et al. | 264/22 |
| 5,135,785 | 8/1992 | Millon | 428/35.2 |

FOREIGN PATENT DOCUMENTS

| | | |
|---|---|---|
| 2036506 | 8/1991 | Canada. |
| 60-80838 | 5/1985 | Japan. |
| WO92/16358 | 10/1992 | WIPO. |

OTHER PUBLICATIONS

Toppan Printing Co Ltd, Derwent Database WPI, AN 94–132150 (Mar. 1994): abstract of Japanese Patent 60–80838.

Atochem, Derwent Database WPI, AN 91–267111/36 (Sep. 1991): abstract of Canadian Patent 2,036,506.

Primary Examiner—Paul R. Michl
Assistant Examiner—LaVonda R. DeWitt

[57] ABSTRACT

The present invention relates to a thermoplastic film including at least one ethylene copolymer, which film is capable of being sealed by a high-frequency current. The film is characterized by its inclusion of a sufficient quantity of at least one N,N'-ethylenebisamide in order to obtain a high-frequency sealing time not exceeding 1 second. The films thus sealed are especially useful for packaging.

11 Claims, No Drawings

THERMOPLASTIC FILM CAPABLE OF BEING SEALED BY HIGH FREQUENCY CURRENT

FIELD OF THE INVENTION

The present invention relates to thermoplastic films that are based on ethylene copolymers. The films are capable of being sealed at a high rate of speed by high-frequency current.

BACKGROUND OF THE INVENTION

In the packaging industry there is an increasing demand for thermoplastic films exhibiting especially excellent mechanical properties, a low friction coefficient, a pleasant feel, and an excellent sealing behaviour.

With regard to the sealing of thermoplastic films, it is recognized that in the case of films of thickness greater than 100 microns, the behaviour of the seals produced by a high-frequency current is superior to the behaviour of the seals produced thermally. However, the sealing times using high-frequency current are generally high (2 to 3 seconds, even longer), and this is nowadays unacceptable in the modern packaging industry, where packaging rates are increasingly fast. In the sector now being considered it is agreed nowadays that a sealing time is short when it does not exceed one second.

International Patent Application WO 92/16358 describes a sealing process using high-frequency current—which will be referred to as HF sealing in what follows—of at least two thermoplastic films which include a copolymer or a copolymer-polymer mixture chosen from the group consisting of an ethylene/vinyl acetate (EVA) copolymer, a mixture of EVA and of a polyethylene, a mixture of EVA and of a polypropylene, or a mixture of EVA, polyethylene, and polypropylene. In these mixtures, or else in the case of the use of an EVA by itself, the vinyl acetate weight content is between 12% and 28%.

The process described in this international application consists in: pressing at least two thermoplastic layers, applying an HF current to the said pressed layers with a view to sealing them together, and recovering the said sealed layers.

Although this procedure gives full satisfaction insofar as the quality of the seal and the mechanical properties of the sealed films are concerned, no information is given in this international application concerning sealing rates and products which would be capable of being obtained at such rates.

Numerous investigations into the rates of HF sealing together of at least two thermoplastic films based on ethylene copolymer indicate that to obtain sealing times lower than or at most equal to one second, it was necessary to increase the energy per unit area of the electrode permitting the HF sealing. It was found, however, that, in the case of high energies, the HF sealing times were actually very short, but that flashes were produced which resulted in the deterioration of the films (tears, holes, high colouring). These flashes, consequently, restricted the energies employed.

It was also found that high comonomer contents in the ethylene copolymers allowed very short HF sealing times. Unfortunately, products with high comonomer contents are difficult to extrude because they are much too sticky, and this is unacceptable on modern packaging machines.

SUMMARY OF THE INVENTION

The present invention provides a thermoplastic film that is capable of being sealed by a high-frequency current. The film comprises at least one ethylene copolymer and an amount, of at least one N,N'-ethylene-bisamide of the formula $[C_nH_{2n\pm1}—C(O)—NH—CH_2]_2$ wherein n is an integer ranging from 17 to 21, sufficient to enable said film to obtain a high-frequency sealing time not exceeding one second. The film may further comprise fatty acid primary amides, silica, and/or talc as antiblocking additives.

The N,N'-ethylene-bisamide is preferably present in an amount sufficient to enable said film to obtain a high-frequency sealing time between 0.2 and 0.5 seconds. Often, the N,N'-ethylene-bisamide will be present in an amount not exceeding 0.6% of the weight of the film. It is preferably present in an amount of between 0.3% and 0.5% of the weight of the film.

The ethylene copolymer is (i) a copolymer of ethylene and of at least one vinyl ester of saturated carboxylic acid containing 2 to 6 carbon atoms, (ii) a copolymer of ethylene and of at least one alkyl acrylate or methacrylate in which the alkyl group contains from 1 to 10 carbon atoms, (iii) the above copolymers further copolymerized with maleic anhydride or glycidyl (meth)acrylate, or (iv) the mixtures of at least two of the above mentioned copolymers.

This invention also comprises packages made of thermoplastic film as described above, wherein the packages have at least one seam formed by sealing a first linear area of said film to a second linear area of said film with high-frequency current. The terminology "linear area of said film" refers to that part of the surface of a thermoplastic film which is fused by the high-frequency current and which, together with another such linear area, mixes and then cools to form a seam of thermoplastic material joining two or more films. In one embodiment, packages according to the present invention are made of multilayer-film including at least one layer of thermoplastic film as described above. These packages have at least one seam formed by high-frequency current sealing a first linear area of the layer of the multilayer film that corresponds to the present invention to a second linear area of a film corresponding to the present invention making up part of a multilayer structure. When a package is made in accordance with the present invention, a single sheet of thermoplastic mono- or multilayer film in accordance with the present invention may be joined to itself, forming an enclosed volume, or two or more such sheets may be joined together, forming multiplanar lamina.

Finally, the present invention contemplates a process for forming a seam comprising superposing a first linear area of a thermoplastic film as described above over a second linear area of the same or a separate thermoplastic film in accordance with the present invention. The two films are situated between a plate and an electrode of a sealing press, pressure is applied to the superposed linear areas of film, a current at a frequency of about 27.12 MHz for a sealing time not exceeding one second is discharged between said plate and said electrode, and the sealed films are then cooled.

DESCRIPTION OF THE PREFERRED EMBODIMENTS

The present invention relates to a thermoplastic film including at least one ethylene copolymer, which film is capable of being sealed by a high-frequency current. The film is characterized by its inclusion of a sufficient quantity of at least one N,N'-ethylenebisamide in order to obtain a high-frequency sealing time not exceeding 1 second. The films thus sealed are especially useful for packaging.

By way of illustration of N,N'-ethylenebisamide usable according to the present invention there will be mentioned N,N'-ethylenebisstearamide, N,N'-ethylenebisoleamide, N,N'-ethylenebisgadoleamide, N,N'-ethylenebiscetoleamide, N,N'-ethylenebiserucamide, and the mixture of at least two abovementioned N,N'-ethylenebisamides. Among the N,N'-ethylenebisamides N,N'-ethylenebisoleamide, referred to hereinafter as EBO, is currently most preferred.

Among the ethylene copolymers which can enter within the constitution of the thermoplastic film according to the invention there may be mentioned especially the polar copolymers of ethylene which have a comonomer content of at least approximately 0.09 mol per 100 g of copolymer, such as:

- copolymers of ethylene and of at least one vinyl ester of saturated carboxylic acid containing 2 to 6 carbon atoms, such as vinyl acetate or vinyl propionate;
- copolymers of ethylene and of at least one alkyl acrylate or methacrylate in which the alkyl group contains from 1 to 10 carbon atoms, such as ethylene/methyl acrylate copolymers or ethylene/butyl acrylate copolymers;
- the above copolymers, also with maleic anhydride or glycidyl (meth)acrylate;
- mixtures of at least two of the abovementioned copolymers.

The film of the invention may also contain polyethylene or copolymers of ethylene and of an alphaolefin.

Among these ethylene copolymers currently most preferred are the thermoplastic films including at least one ethylene-vinyl acetate copolymer which has a vinyl acetate weight content not exceeding 40% and preferably between 12% and 28%.

The sealing time—lower than or at most equal to one second—of the thermoplastic film based on ethylene copolymer can be obtained by means of the use of a weight content of N,N'-ethylenebisamide not exceeding 0.6% and preferably between 0.3% and 0.5% relative to the thermoplastic film.

According to an alternative form of the invention the thermoplastic film additionally includes an antiblocking additive chosen from the group consisting of fatty acid primary amides, silica, talc, and a mixture of at least two of the abovementioned compounds.

By way of illustration of a primary amide of a saturated fatty acid it is possible to mention erucamide, oleamide, stearamide, palmitamide and the mixture of at least two of the abovementioned compounds. Among these fatty acid primary amides it is preferred to employ erucamide.

These antiblocking additives can be employed in proportions not exceeding approximately 2% by weight relative to the thermoplastic film.

The thermoplastic film based on ethylene copolymer may also contain at least one additive which is usual in ethylene copolymers, such as:

- slip-improving additives such as, for example, a metal fatty acid salt (e.g., zinc stearate),
- antioxidants, for example a sterically hindered phenol, a mercaptan, or a phosphite,
- absorbers of ultraviolet radiation, such as substituted benzophenones, substituted phenylbenzotriazoles, and sterically hindered amines,
- flame suppressors such as nickel complexes, and
- inorganic or organic pigments such as zinc oxide or titanium oxide.

According to the present invention the abovementioned primary amides of a saturated fatty acid and the additives must be employed in quantities such that they do not impair the speed of sealability of the thermoplastic films.

The thermoplastic film according to the present invention can be obtained especially by extrusion, by extrusion blowing or by the technology known as "casting" of a composition prepared by any means enabling the N,N'-ethylenebisamide and, optionally, the antiblocking agent and the other additive(s) to be dispersed in the ethylene copolymer.

To obtain good reproducibility insofar as the seals are concerned, the additives must be thoroughly dispersed in the elthylene copolymer. Heterogeneities in the dispersion of additives would result in a poor quality of the seals at a high rate.

The thickness of the thermoplastic film according to the present invention may vary widely. It may generally be not more than 500 microns and preferably between 50 and 300 microns.

According to the present invention at least two thermoplastic films based on ethylene copolymer, preferably two EVA films, will be sealed. The present invention also relates to packaging including the film of the invention which has been sealed to itself by HF.

However, improved permeabilities to gases and/or water vapour are often sought after in food packaging. They are generally obtained by the technique known as coextrusion. This technique consists especially in coextruding at least two layers of polymer exhibiting, respectively, the required properties.

The present invention also relates to packagings which are multilayer films including at least one layer of the film of the invention on one of the faces (i) and which are HF-sealed after this face (i) has been placed in contact with itself.

By way of illustration of such multilayer composites it is possible to cite the EVA/PE/EVA and EVA/PP/EVA trilaminates and the multilaminates such as EVA/binder/EVOH/binder/EVA and EVA/binder/PA/binder/EVA, in which EVA denotes the ethylene/vinyl acetate copolymers, PE and PP denote polyethylene and polypropylene, respectively, and EVOH denotes ethylene/vinyl alcohol copolymers.

According to an alternative form of the invention, these complexes, including at least one ethylene copolymer-based layer according to the present invention, especially EVA-based, can be sealed to each other by an HF current at high rates, that is to say with sealing times not longer than a second.

Sealing of the thermoplastic films according to the present invention can be performed by a known method which consists in bringing at least two thermoplastic films (or composites based on ethylene copolymer according to the present invention) between the plates, optionally preheated, of an HF sealing press, in applying a pressure which is a function of the thickness of the films to be sealed and then, after the oscillating circuit has been tuned to obtain maximum energy, a current at a frequency of 27.12 mHz is applied to the layers which are kept under pressure.

This current is maintained for a period known as sealing time—which does not exceed 1 second—and then cooling is optionally applied before the sealed films are recovered.

The tensile strength is determined according to NFT standard 54120 on the films obtained.

The films according to the present invention offer the advantage of having a high tensile strength even with very short sealing times—approximately 0.2 seconds.

These films are employed especially for the packaging of cleaning products.

EXAMPLES

The following examples illustrate the invention.

Preparation of the EVA Films

The films were obtained from compositions prepared from the following constituents:

- EVA: ethylene/vinyl acetate copolymer containing 24% by weight of vinyl acetate and exhibiting a melt index of 3 g/10 min measured according to ASTM standard D 1238 at 190° C. under a 2.16 kg load,
- N,N'-ethylenebisoleamide (EBO), introduced in the form of a master batch containing 6% of EBO in the above-mentioned EVA,
- $TiO_2$ introduced in the form of a master batch in a ratio of 70% of $TiO_2$ in a polyethylene,
- $SiO_2$ introduced in the form of a master batch in a ratio of 50% of $SiO_2$ in a polyethylene,
- Erucamide (Eru.) introduced in the form of a master batch containing 5% of erucamide in a polyethylene,
- Stearamide (Ste.) introduced in the form of a master batch containing 5% of stearamide in a polyethylene.

EVA granules and the various constituents (in the form of master batches) are blended dry in a Flobin-type mixer for 15 minutes according to weight percentages as shown in Table 1.

The mixture thus obtained is fed to a Buss Kok-neader fitted with a single screw of 88 mm diameter and with an L/D equal to 21 and with a cavity transfer mixer-type mixing head which has 8 rows of holes. The screw speed is 100 revolutions per min and the extrusion temperature is between 170° and 205° C.

The product is next extruded in film form using the technique known as "casting" according to conditions usually employed for an EVA resin.

The EVA films have a thickness of 220 microns.

High-Frequency Sealing

A Thimonnier model M31-BS 22 HF sealing press is employed, equipped with an HF generator of 2 kW power, controllable by an electronic timer, a manual device for adjusting HF, comprising 5 positions which correspond to the powers of 0.4 kW, 0.8 kW, 1.2 kW, 1.6 kW and 2 kW respectively, and a compressed air supply enabling pressure of at least $2 \times 10^5$ Pa to be obtained.

The electrode area is 10.25 $cm_2$.

The films to be sealed are brought between the plate and the electrode of the press, a pressure is applied and then, after the position of the manual device has been chosen in order to obtain a given power, a current at a frequency of 27.12 MHz is applied and maintained for a period, known as sealing time, which ranges from 0.2 to 1 second.

The sealed films are cooled and the tensile strength is then determined according to NFT standard 54120 (pulling speed equal to 100 mm/min).

The results obtained on the seal of two EVA films of 220 microns thickness are reported in Table 1.

Table 2 relates to the results of sealing of a trilaminate composite EVA/PE/EVA, the respective thicknesses of which are 80 μm/40 μm/80 μm. The composition of the EVA layer is identical with that of Example 3 in Table 1. The PE is a low-density linear polyethylene.

TABLE 2

| SEALING TIME (IN s) | POWER (kW) | TENSILE STRENGTH (N/15 mm) |
|---|---|---|
| 1 | 0.8 | 24 |
|  | 1.2 | 28 |
| 0.5 | 1.2 | 28 |
|  | 1.6 | 24.2 |
| 0.2 | 1.2 | 20.8 |
|  | 1.6 | 21 |

TABLE 1

| EXAMPLE | EVA (%) | $TiO_2$ (%) | $SiO_2$ (%) | EBO (%) | Eru. (%) | Ste. (%) | POWER (kW) | POWER (kW/cm³) | SEALING TIME (in s) | TENSILE STRENGTH (N/15 mm) |
|---|---|---|---|---|---|---|---|---|---|---|
| 1 | 94.9 | 3.6 | 1.2 | 0.3 |  |  | 0.8 | 0.078 | 1 | 28 |
|  |  |  |  |  |  |  | 1.2 | 0.117 | 0.5 | 30 |
|  |  |  |  |  |  |  | 1.6 | 0.156 | 0.2 | 24 |
| 2 | 94.6 | 3.6 | 1.2 | 0.6 |  |  | 0.8 | 0.078 | 1 | 30 |
|  |  |  |  |  |  |  | 1.2 | 0.117 | 1 | 39 |
|  |  |  |  |  |  |  | 1.2 | 0.117 | 0.5 | 30 |
|  |  |  |  |  |  |  | 1.6 | 0.156 | 0.5 | 40 |
|  |  |  |  |  |  |  | 1.6 | 0.156 | 0.2 | 22 |
|  |  |  |  |  |  |  | 2 | 0.195 | 0.2 | 32 |
| 3 | 94.8 | 3.6 | 1.2 | 0.3 | 0.1 |  | 0.8 | 0.078 | 1 | 24 |
|  |  |  |  |  |  |  | 1.2 | 0.117 | 1 | 43 |
|  |  |  |  |  |  |  | 1.2 | 0.117 | 0.5 | 27 |
|  |  |  |  |  |  |  | 1.6 | 0.156 | 0.5 | 35 |
|  |  |  |  |  |  |  | 1.6 | 0.156 | 0.2 | 22 |
|  |  |  |  |  |  |  | 2 | 0.195 | 0.2 | 33 |
| 4 | 94.8 | 3.6 | 1.2 |  | 0.1 | 0.3 | 0.8 | 0.078 | 1 | Separation |
|  |  |  |  |  |  |  | 1.2 | 0.117 | 1 | 26 |
|  |  |  |  |  |  |  | 1.2 | 0.117 | 0.5 | 20 |
|  |  |  |  |  |  |  | 1.6 | 0.156 | 0.5 | 28 |
|  |  |  |  |  |  |  | 1.6 | 0.156 | 0.2 | Separation |

TABLE 1-continued

| | COMPOSITION | | | | | | POWER | | SEALING TIME | TENSILE STRENGTH |
| --- | --- | --- | --- | --- | --- | --- | --- | --- | --- | --- |
| EXAMPLE | EVA (%) | TiO$_2$ (%) | SiO$_2$ (%) | EBO (%) | Eru. (%) | Ste. (%) | (kW) | (kW/cm$^3$) | (in s) | (N/15 mm) |
| | | | | | | | 2 | 0.195 | 0.2 | Flashes with two repeats |

What is claimed is:

1. A thermoplastic film capable of being sealed by a high-frequency current with a high-frequency sealing time not exceeding one second, said film comprising at least one ethylene copolymer and between 0.3% and 0.5% of the weight of the film of at least one N,N'-ethylene-bisamide of the formula [C$_n$H$_{2n\pm1}$—C(O)—NH—CH$_2$]$_2$ wherein n is an integer ranging from 17 to 21.

2. The film of claim 1 wherein the ethylene copolymer is (i) a copolymer of ethylene and of at least one vinyl ester of saturated carboxylic acid containing 2 to 6 carbon atoms, (ii) a copolymer of ethylene and of at least one alkyl acrylate or methacrylate in which the alkyl group contains from 1 to 10 carbon atoms, (iii) the above copolymers further copolymerized with maleic anhydride or glycidyl (meth)acrylate, or (iv) the mixtures of at least two of the abovementioned copolymers.

3. The film of claim 2, wherein the ethylene copolymer is an ethylene-vinyl acetate copolymer.

4. The film of claim 1, wherein the N,N'-ethylenebisamide is present in an amount sufficient to enable said film to obtain a high-frequency sealing time between 0.2 and 0.5 seconds.

5. The film of claim 1, wherein the N,N'-ethylenebisamide is N,N'-ethylenebisoleamide.

6. The film of claim 1, further comprising an antiblocking additive chosen from the group consisting of fatty acid primary amides, silica, talc, and mixtures thereof.

7. A package-comprising a thermoplastic film in accordance with claim 1, wherein said package comprises at least one seam formed by sealing a first linear area of said film to a second linear area of said film with high-frequency current.

8. A package comprising a multilayer film including at least one layer of thermoplastic film in accordance with claim 1, wherein said package comprises at least one seam formed by sealing a first linear area of said at least one layer of film to a second linear area of said at least one layer of film with high-frequency current.

9. A process for forming a seam joining together two thermoplastic film sections, each of said film section comprising at least one ethylene copolymer and an amount, sufficient to enable each said film to obtain a high-frequency sealing time to the other not exceeding one second, of at least one N,N'-ethylene-bisamide of the formula [C$_n$H$_{2n\pm1}$—C(O)—NH—CH$_2$]$_2$ wherein n is an integer ranging from 17 to 21, which process comprises the steps of superposing a first linear area of a thermoplastic film section as described over a second linear area of a thermoplastic film section as described between a plate and an electrode of a sealing press, applying pressure to said superposed linear areas of film, applying a high frequency current for a sealing time not exceeding one second between said plate and said electrode in order to seal said films together, and then cooling the sealed films.

10. The process of claim 12 wherein said high frequency current has a frequency of 27.12 MHz.

11. A process for forming a seam joining together two thermoplastic film sections, each of said film section comprising at least one ethylene copolymer and an amount, sufficient to enable each said film to obtain a high-frequency sealing time to the other not exceeding one second, of at least one N,N'-ethylene-bisamide of the formula [C$_n$H$_{2n\pm1}$—C(O)—NH—CH$_2$]$_2$ wherein n is an integer ranging from 17 to 21, which process comprises the steps of superposing a first linear area of a thermoplastic film section as described over a second linear area of a thermoplastic film section as described between a plate and an electrode of a sealing press, applying pressure to said superposed linear areas of film, applying power to said superposed linear areas of film at a rate of from 0.078 to 0.195 KW/cm$_3$ for a sealing time not exceeding one second between said plate and said electrode in order to seal said films together, and then cooling the sealed films.

* * * * *